April 1, 1930.  J. LAURO  1,753,124
AUTOMOBILE TIRE LOCK
Filed Aug. 21, 1928   2 Sheets-Sheet 1
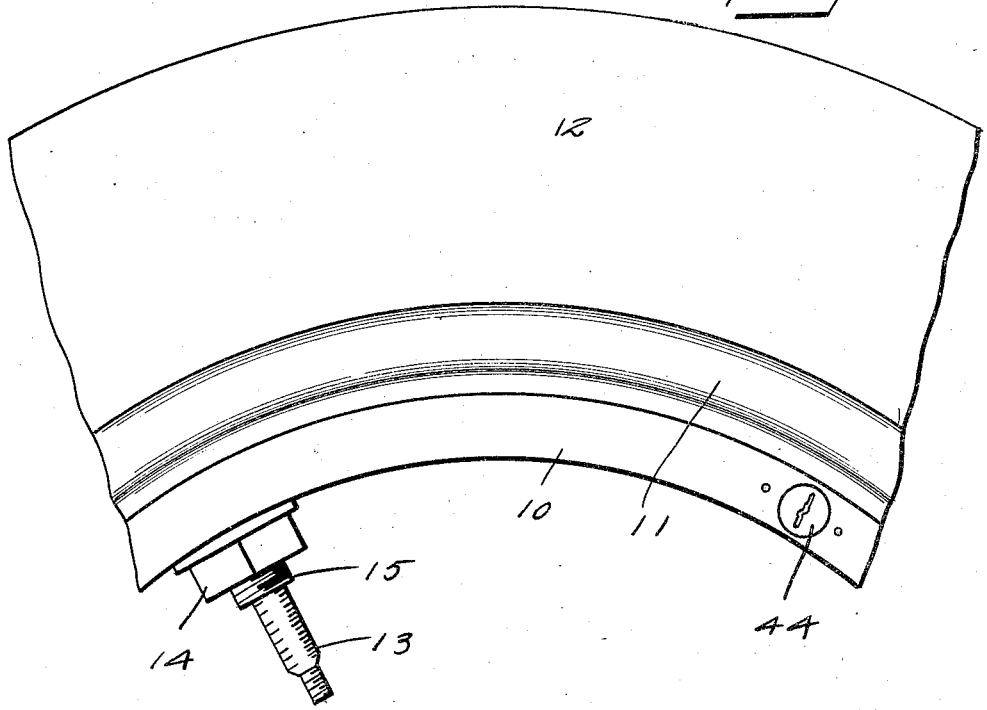
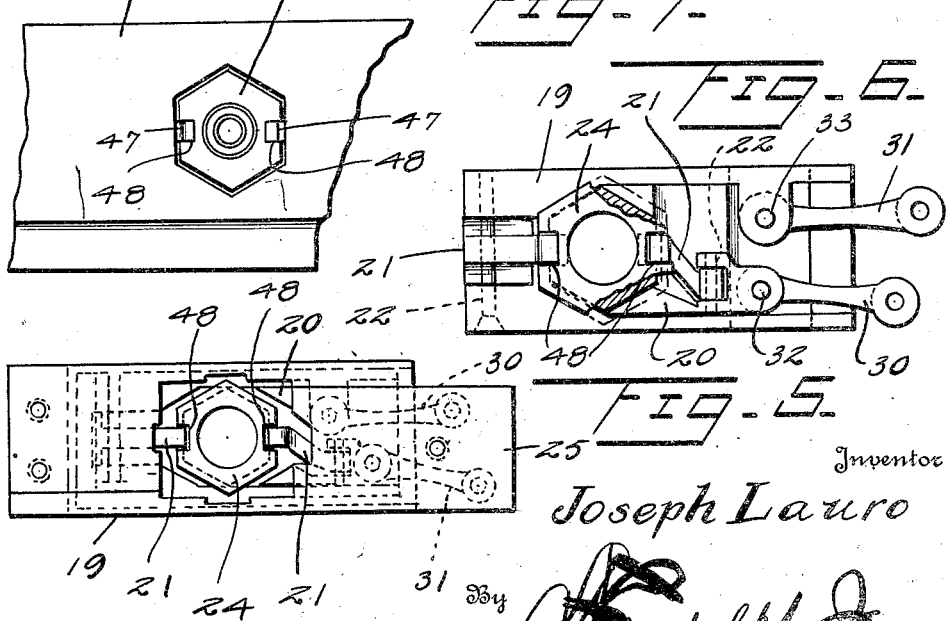
Inventor
Joseph Lauro

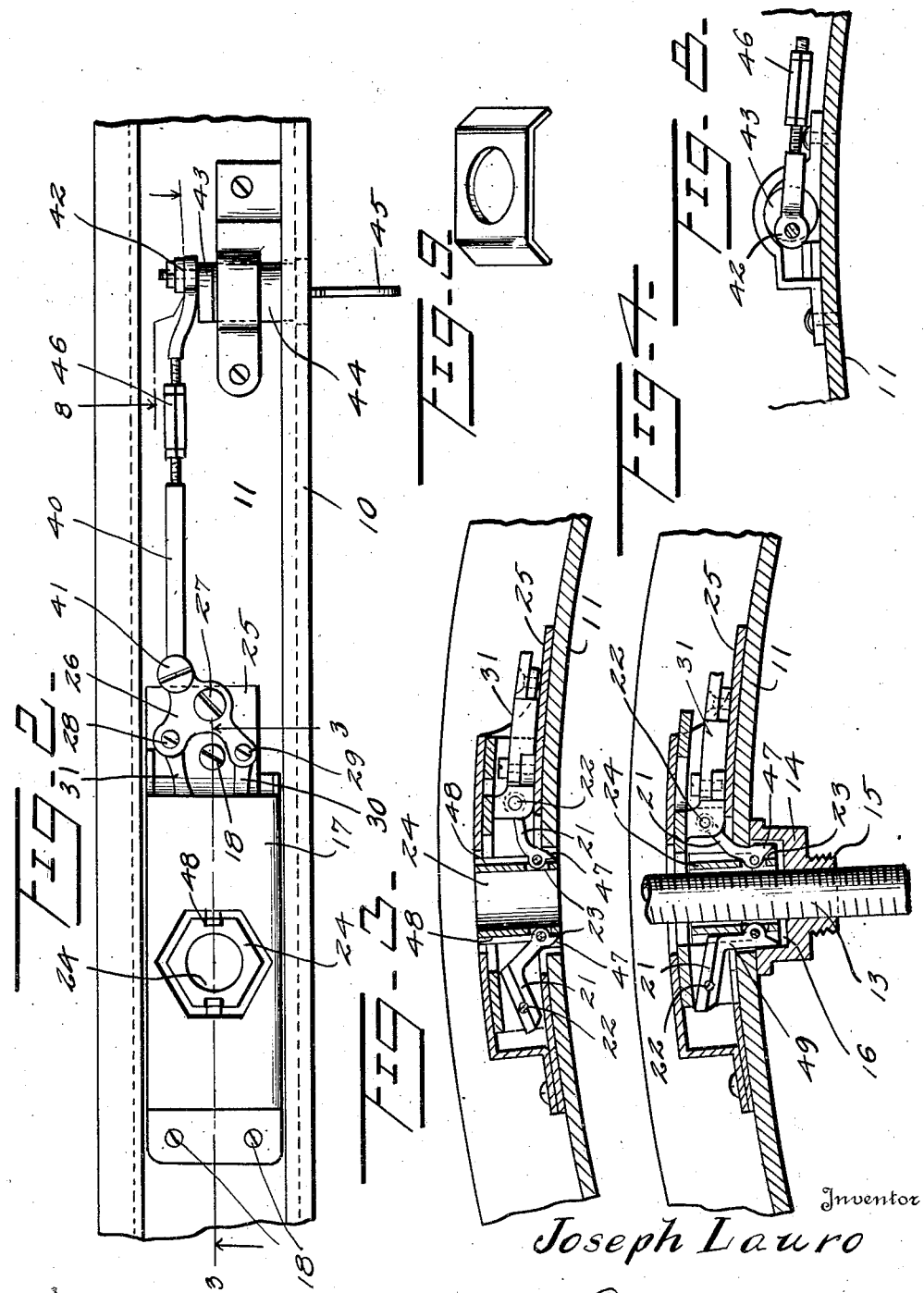

Patented Apr. 1, 1930

1,753,124

UNITED STATES PATENT OFFICE

JOSEPH LAURO, OF SOUTH MIAMI, FLORIDA, ASSIGNOR OF ONE-HALF TO RAPHAEL RAGOZZINO, OF MIAMI, FLORIDA

AUTOMOBILE TIRE LOCK

Application filed August 21, 1928. Serial No. 301,137.

This invention relates to a lock or means whereby a rim (both demountable and clincher) may be locked or secured to the wheel rim or felly, against unauthorized removal, with a view to making it practically impossible to remove a tire and tube from a wheel without destroying the same.

Another advantage of the structure is that the lock will reduce the number of automobile thefts because a thief will know that in case of a puncture or blow-out of a tire, he cannot remove the tire from the wheel for purposes of repair and replacement, and therefore will seek an unprotected tire.

The more specific objects and advantages will in part be pointed out or become apparent from a consideration of the description following taken in connection with accompanying drawings illustrating an operative embodiment.

In said drawings:—

Figure 1 is a fragmentary elevation showing a tire protected in accordance with the invention, Figure 2 is a plan view looking upon the wheel rim, Figure 3 is a sectional view taken on the line 3—3 of Figure 2, Figure 4 is a sectional view similar to Figure 3 but showing the parts in locked position as contrasted with Figure 3 where they are in the open position, Figure 5 is an inverted plan view of the lock, Figure 6 is an inverted plan view of the locking member and coacting slide, Figure 7 is a fragmentary view of the wheel rim, reversed to Figure 2, Figure 8 is a cross sectional view taken on the line 8—8 of Figure 2, and Figure 9 is a detail perspective view of a clip as used in connection with a clincher rim.

Referring specifically to the drawings, 10 designates a usual rim or felly as used on a wheel, for instance but not necessarily, an automobile wheel, which is usually of metal and channel shape in cross section. Detachably mounted on the rim 10 is a detachable rim 11 which carries a tire 12, and usually a pneumatic tire and tube, from the latter of which projects the usual exteriorly screw threaded tube 13 which contains a usual inflation-control valve. Threaded on the exterior of the tube 13 is a nut 14 adapted to bind against the inner annular surface of the rim 11 which is exteriorly screw threaded as at 15 to accommodate a valve cap and which is provided with an internal recess at 16 to coact with locking mechanism.

Disposed in the channel of the rim 10 and below the rim 11 is a suitable lock casing 17 which is substantially rectangular. Said lock casing may be secured to the rim as by screws at 18. Relatively slidable within the lock casing circumferentially of the rim, are coacting slides 19 and 20. Each of said slides has a lever 21 pivoted thereto as at 22 which are also pivoted as at 23 to a vertically movable lock member 24 generally in the form of a tube externally hexagonal and through which tube 13 is freely movable.

The base of the casing 17 is extended at one end as at 25 and a bell crank lever 26 is pivoted thereto as at 27. Pivoted to the bell crank lever 26 at 28 and 29, respectively, are links 30 and 31, in turn pivoted at 32 and 33 to the slides 20 and 19, respectively.

When the rim 11 and tire 12 carried thereby is to be removed, lock member 24 is in the position shown in Figure 3 where it is completely outwardly of the opening which receives the rim 10. Under normal conditions, however, the locking member 24 is extended as shown in Figure 4 into the recess 16 so that the nut 14 cannot be unscrewed or any other part removed which would enable a thief to remove the rim 11 and tire 12 thereon.

Operation of the bell crank 26 controls the position of locking member 24 and is operable to move the same from the open position of Figure 3 to the locked position of Figure 4 or vice versa. To this end, a shifting rod 40 is pivoted at 41 to the bell crank and at 42 is pivoted to a movable element 43 of a suitable key-operated lock 44 whose key is shown at 45. This lock may be of any desired construction and accordingly needs no specific description.

The authorized person applying the key 45 to the lock turns the key 45 in one direction to rotate the element 43 and cause rod 40 to shift bell crank 26 and move the slides 19 and 20 toward each other which causes the levers 21 to move on their pivots and lower the locking member 24 into the position shown in Figure 4 where it engages recess 16, preventing removal of the nut 14 and accordingly the tire and its rim. In order to release the tire and its rim, it is simply necessary to turn the key 45 in the opposite direction which moves the slides 19 and 20 apart and accordingly elevating the locking member 24 outwardly of the space of the tire rim 11, to the position shown in Figure 3.

An adjustable connection 46 may be provided in the rod 40 whereby it is possible to lengthen or shorten it.

It will be noted that the levers 21 have lugs 47 thereon which limit movement of the member 24 to the position shown in Figure 3 by their abutment against adjacent walls in grooves 48 provided longitudinally of the locking member. Movement of the locking member 24 and associated parts to the other position as in Figure 4 is limited by reason of the abutment of a portion 49 of one of the levers 21 in the base wall of one of the recesses 48.

Referring now to Figure 9, an element 50 is shown primarily adapted for use in connection with a clincher rim. This element is designated 50 and in effect is a washer, having a central opening at 51. In use, before the tire and inner tube are applied to the clincher rim, the washer or clip 50 is loosely applied to the stem of the valve, being received in the opening 51.

Various changes may be resorted to provided they fall within the spirit and scope of the invention.

I claim as my invention:

1. In combination with a rim, a tire having a tube projecting therethrough, a securing element engaging said tube, locking means carried by the rim, means operable to place the locking means in and out of engagement with said tube consisting of a locking member, relatively movable slides, and levers connected to said locking member and to said slides.

2. In combination with a rim, a tire having a tube projecting therethrough, a securing element engaging said tube, locking means carried by the rim, means operable to place the locking means in and out of engagement with said tube consisting of a locking member, relatively movable slides, levers connected to said locking member and to said slides, said levers being engageable with the locking member at opposite extremes of movement to limit the latter.

3. In combination with a rim, a tire having a tube projecting therethrough, a securing element engaging said tube, locking means carried by the rim, means operable to place the locking means in and out of engagement with said tube consisting of a locking member, relatively movable slides, levers connected to said locking member and to said slides, a bell crank lever, connections from said bell crank lever to said slides, and means operable to shift the bell crank lever.

In testimony whereof I affix my signature.

JOSEPH LAURO.